Patented Nov. 2, 1937

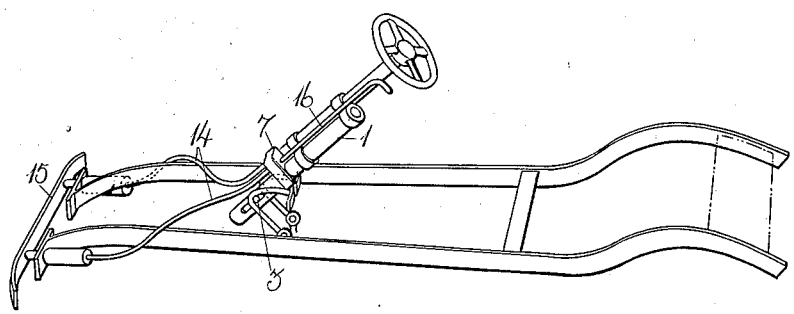
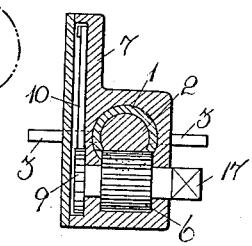
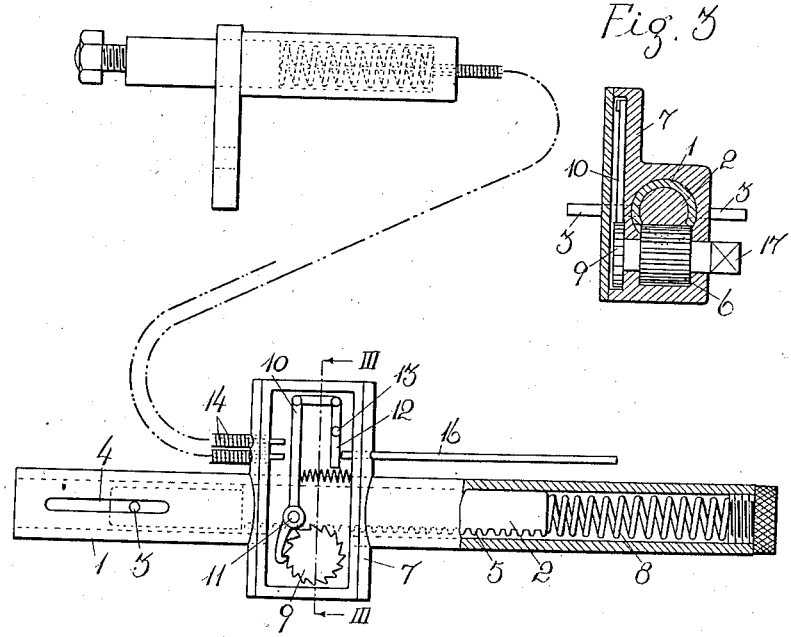

2,097,740

UNITED STATES PATENT OFFICE 2,097,740

EMERGENCY STOPPING DEVICE FOR MOTOR CARS

Boku Saigen, Keijo, Japan, assignor to Toho Kagakukogyo Kabushiki-Kaisha, Keijo, Japan, a corporation of Japan Application June 2, 1936, Serial No. 83,134
In Japan October 10, 1935

2 Claims. (Cl. 180—83)

This invention relates to improvements in an emergency stopping device for motor cars comprising an automatically operating means of a brake lever as well as a clutch lever of the car, which operates both levers simultaneously in case the bumper of the car receives a shock from an obstruction in the way.

The device consists of a plunger to be operated by a spring, a releasing means which releases the spring from its energy-stored condition so as to have the plunger operate the brake and clutch levers simultaneously, and a power transmitting means which actuates the releasing means by the power generated due to a shock received at the bumper.

Fig. 1 shows a part of a motor car's frame on which are pivoted brake and clutch levers accompanied by the device according to this invention.

Fig. 2 is a part sectional elevation of the device, and Fig. 3 shows a section on the line III—III of Fig. 2.

In the drawing, 1 is a tubular case in which is slidably provided a plunger 2, and a series of teeth 5 are provided along one side of the plunger. A cross-pin 3 is fixed at the front end of the plunger, and each end of the cross-pin extends through a slit 4 perforated on the wall of the case, so that the plunger always keeps its toothed side facing a pinion 6.

This pinion is journaled in a box 7 through which the tubular case 1 extends and is fixed thereto. A helical spring 8 is placed at the bottom of the tubular case in contact with the inner end of the plunger. On the axis of the pinion is integrally provided a ratchet wheel 9, and a hook on a lever 10 pivoted on a pin 11 is engaged with the ratchet wheel as shown in Fig. 2.

The lever 10 is connected with another lever 12 pivoted on a pin 13, so that the hook-end of the lever 10 disengages from the ratchet wheel when the upper end of that lever is pushed toward right or the lower end of the lever 12 is pushed toward left of Fig. 2.

The case 1 is fixed to the protecting sheath of the steering handle in such a manner that each end of the cross-pin extends inside of the curved corner of the clutch lever and brake lever, respectively, pivoted on the frame of the car, as clearly illustrated in Fig. 1.

As shown in Fig. 1, a flexible shaft 14 extends from each end of the bumper 15 of the car to the box 7, and the end of the flexible shaft is almost in touch with the lever 10 in the box. A bar 16 is provided along the sheath of the steering handle of the car and the chauffeur can actuate the emergency device by means of this bar, that is, if he pushes this bar, the lever 12 serves to disengage the hook-end of the lever 10 from the ratchet wheel.

A boss of the pinion 6 extends out the box 7 and has a square head 17. By means of a box-handle with a square recess at its end, the pinion can be turned so as to slide the plunger inwardly compressing the spring, so that the latter forces out the plunger in case the hooked lever is disengaged from the ratchet wheel.

When the cross-pin goes ahead, the brake and clutch levers are rockered on their pivots just as they are strongly clamped by a chauffeur, and the clutch for disconnecting the coupling of the driving motor and the wheel shaft and the brake members for the wheels are actuated so as to suddenly stop the car.

It is easily taken from the above explanations that the plunger always takes the retired position compressing the spring, and this condition is maintained by the co-operation of the ratchet wheel and the hooked lever, and, when the car strikes against an obstruction in the way before the chauffeur can stop the car, the sudden retiring of the bumper makes the flexible shafts strike the hooked lever and release the confined condition of the spring, with a result that the plunger quickly advances to actuate both the brake and clutch levers.

The flexible shaft 14 can be replaced by a hydraulic power transmitting means or an electromagnetic device.

What I claim is:—

1. An emergency stopping device for motor cars, comprising a bumper, brake and clutch operating levers, a spring-actuated plunger slidable in a casing and having a cross pin for directly operating said levers, a pinion and a ratchet wheel mounted on a shaft, said pinion engaging a rack on the plunger for moving the plunger to energize its actuating spring, said spring also being arranged in the casing, a pawl engaging the ratchet wheel to hold the spring in energized condition and means operable by pressure transmitted from the bumper or applied by the operator for disengaging said pawl from the ratchet wheel to release the spring.

2. An emergency stopping device for motor cars, comprising a bumper, brake and clutch operating levers, a spring-actuated plunger extending between the usual brake and clutch pedals of the motor car and having a cross pin projecting from said plunger in opposite directions into cooperative relationship with said pedals below the foot-rest portions thereof, whereby to operate said brake and clutch operating levers directly, means for energizing the plunger-actuating spring and for holding said spring in energized condition, control means extending from the bumper to release the spring upon movement of the bumper relative to the car frame and separate control means adapted to be actuated by the operator to release the spring.

BOKU SAIGEN.